(12) United States Patent
Hsu

(10) Patent No.: US 8,264,120 B2
(45) Date of Patent: Sep. 11, 2012

(54) PERMANENT-MAGNET-LESS SYNCHRONOUS RELUCTANCE SYSTEM

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 450 days.

(21) Appl. No.: 12/274,895

(22) Filed: Nov. 20, 2008

(65) Prior Publication Data

US 2009/0146511 A1   Jun. 11, 2009

Related U.S. Application Data

(60) Provisional application No. 60/989,201, filed on Nov. 20, 2007.

(51) Int. Cl.
*H02K 19/26* (2006.01)
*H02K 16/04* (2006.01)

(52) U.S. Cl. ........................ 310/266; 164/168

(58) Field of Classification Search ............... 310/164, 310/165, 166, 168, 216.017, 266, 178, 54, 310/263

See application file for complete search history.

(56) References Cited

U.S. PATENT DOCUMENTS

| | | | |
|---|---|---|---|
| 588,602 A | 8/1897 | Rice | |
| 2,796,542 A * | 6/1957 | Bekey et al. | 310/162 |
| 2,987,637 A * | 6/1961 | Bertsche et al. | 310/54 |
| 3,017,562 A * | 1/1962 | Duane | 322/46 |
| 3,132,272 A * | 5/1964 | Macfarlane | 310/168 |
| 3,303,369 A * | 2/1967 | Erickson | 310/168 |
| 3,321,652 A | 5/1967 | Opel | |
| 3,484,635 A * | 12/1969 | Mackallor, Jr. | 310/266 |
| 3,663,846 A | 5/1972 | Wagner et al. | |
| 4,110,642 A * | 8/1978 | Thiele | 310/51 |
| 4,250,424 A | 2/1981 | Sento et al. | |
| 4,898,038 A | 2/1990 | Kitamura | |
| 4,980,595 A * | 12/1990 | Arora | 310/263 |
| 5,929,541 A | 7/1999 | Naito et al. | |
| 6,608,424 B2 | 8/2003 | Kusase | |
| 6,680,557 B2 * | 1/2004 | Kusase | 310/263 |
| 6,891,301 B1 | 5/2005 | Hsu | |

(Continued)

FOREIGN PATENT DOCUMENTS

JP   63195382   * 8/1988

(Continued)

OTHER PUBLICATIONS

Fitzgerald, A. E. et al., Chapter 7, "Engineering Considerations," Fig. 7-16, Electric Machinery: The Dynamics and Statics of Electromechanical Energy Conversion, 2nd Ed., McGraw-Hill Book Company, New York, NY, Copyright 1961, pp. 362.

(Continued)

*Primary Examiner* — Karl Tamai
(74) *Attorney, Agent, or Firm* — Brinks Hofer Gilson & Lione

(57) ABSTRACT

A permanent magnet-less synchronous system includes a stator that generates a magnetic revolving field when sourced by an alternating current. An uncluttered rotor is disposed within the magnetic revolving field and spaced apart from the stator to form an air gap relative to an axis of rotation. The rotor includes a plurality of rotor pole stacks having an inner periphery biased by single polarity of a north-pole field and a south-pole field, respectively. The outer periphery of each of the rotor pole stacks are biased by an alternating polarity.

15 Claims, 7 Drawing Sheets

U.S. PATENT DOCUMENTS

| | | |
|---|---|---|
| 6,977,454 B2 | 12/2005 | Hsu |
| 7,134,180 B2 | 11/2006 | Hsu |
| 7,135,802 B2 | 11/2006 | Seki et al. |
| 7,270,203 B2 | 9/2007 | Hsu |
| 7,834,512 B2 | 11/2010 | Isogai |
| 8,110,961 B2 * | 2/2012 | Hsu ................. 310/266 |
| 2006/0197346 A1 | 9/2006 | Maehara |
| 2009/0146511 A1 * | 6/2009 | Hsu ................. 310/46 |
| 2009/0218895 A1 * | 9/2009 | Hsu ................. 310/46 |

FOREIGN PATENT DOCUMENTS

| | | |
|---|---|---|
| JP | 2001-157425 | 6/2001 |
| JP | 2001157425 * | 6/2001 |

OTHER PUBLICATIONS

Parsa, L. et al., "Five-Phase Interior Permanent Magnet Motor with Low Torque Pulsation," *IEEE*, 2005, pp. 1770-1775.

* cited by examiner

US 8,264,120 B2

PERMANENT-MAGNET-LESS SYNCHRONOUS RELUCTANCE SYSTEM

PRIORITY CLAIM

This application claims the benefit of priority from provisional application 60/989,201, filed Nov. 20, 2007, which is incorporated by reference.

GOVERNMENT INTEREST

The application was made with United States Government support under Contract No. DE-AC05-00OR22725 between the United States Department of Energy and U.T. Battelle, LLC. The United States Government has certain rights in these inventions.

BACKGROUND OF THE INVENTION

1. Technical Field

This disclosure relates to electric machines, and more specifically to synchronous motors.

2. Related Art

Due to advances in form and performance demand for motors is increasing. Reduced sizes and improved reliability have broadened the acceptance of electric motors to industries that include transportation, aerospace, robotics, and healthcare.

Some motors use permanent magnets to generate torque. Because the properties of these materials may vary in time, such materials may be unsuitable for some applications. In vehicles, for example, fuel efficiency may be compromised when a permanent magnetic motor is not actuated to drive a vehicle. The continuous fields of the permanent magnets may resist the driving torque of a vehicle and generate core losses.

SUMMARY

A permanent magnet-less synchronous system includes a stator that generates a magnetic revolving field when sourced by an alternating current. An uncluttered rotor is disposed within the magnetic revolving field and spaced apart from the stator by an air gap relative to an axis of rotation. The rotor includes a plurality of rotor pole stacks having an inner periphery biased by a single polarity. The outer periphery of each of the rotor pole stacks are biased by an alternating polarity.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE PREFERRED EMBODIMENTS

A synchronous system generates high power density at a high torque to weight ratio. Without permanent magnets, some of these brushless slip-ring-less constructions have a reduced size, lower weights (e.g., due to lightweight materials such as aluminum that may form the frames) and less core losses. In vehicles that may use radial gap motors, there may be little to no core losses when the system runs free without field excitations. Without a magnetic resistance, fuel efficiency may increase. The high power density and driving torque of these systems may be used in other applications that have short, intermediate, or long core lengths. To improve power factors, the reluctance torque component may be located at about less than about a ninety degree load angle. Dynamic balances are improved when systems do not include rotating rotor windings. In these systems and others the stator fields may be cut off to enhance safety, fields may be boosted to increase or reach peak acceleration power in short time periods (e.g., about eighteen seconds), power factors may be optimized (e.g., lowering the loading in inverter applications), and efficiency maps may increase due to the adjustable fields. The synchronous systems may be mass produced and may have higher power densities and lower power costs per kilowatt than some induction systems. Some synchronous systems are highly efficient in comparison to some permanent magnet motor constructions. The systems may be operated as an alternating current machine, a motor, or a generator.

Figure 1:
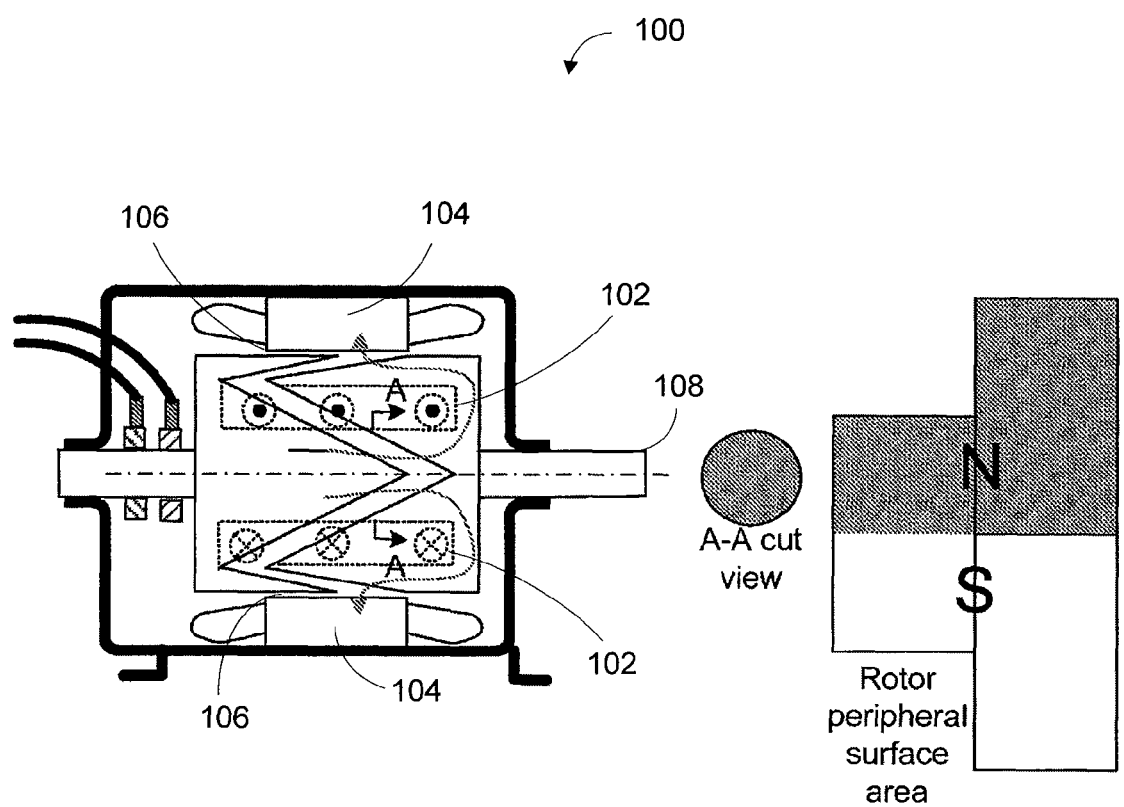
FIG. 1 is a cross section of a claw pole machine.

FIG. 1 is cross section of a claw pole machine 100. In cross section the claw pole machine 100 includes an uncluttered rotor 102 rotatably disposed between concentric stator portions 104 that may include distributed or core windings, bobbin windings, or other current-carrying conductor. In some systems, stator portions 104 comprise teeth for N phases, where N may be a natural number of 3 or more. The teeth are juxtaposed in an axial direction that includes return paths for interconnecting the teeth to the N phases. N−1 annular slots may be formed between teeth for N phases to receive disposed stator coils. A plurality of poles may project radially inward from inner ends of the teeth for N phases that extend in an axial direction. The poles for one of the N phases may at least partially overlap the poles of another of the N phases in the axial direction when viewed in a circumferential direction. The poles for N phases may be arranged in phase, and the uncluttered rotor 102 is arranged so that magnetic poles of the same polar sign are displaced in the peripheral direction relative to the poles for each phase. Generated magnetic fluxes may be displaced by electrical angles of 360 degrees (or about 360 degrees) divided by N. Alternative stator or motor structures include those described in U.S. Pat. No. 7,135,802 that is incorporated by reference. The uncluttered rotor 102 is separated from the concentric stator portions 104 shown in FIG. 1 by cylindrically shaped air gaps 106. The uncluttered rotor 102 may be centered about a rotational axis and positioned apart from a stationary hollow or coolant shaft 108 that may be disposed adjacent to a pair of stationary exciter cores portions 202 (shown in cross section in FIG. 2). In some synchronous systems the exciter cores portions 202 are coaxially positioned about an axis of rotation of the uncluttered rotor 102.

The stationary excitation core portions 202 may include two or more magnetically conducting discs that may include recessed ring-shape like spaces for receiving the excitation conductors or coils. In a disc system, the number of discs may be proportional to the available areas for the flux passing axially through the stationary excitation core. The longer the core length of a machine, the greater the number of stationary discs may be used. Many types of materials may form the discs such as solid iron, compressed conducting powder (such as iron), and other materials that provide good magnetic conduction or ferromagnetic properties. In some applications the discs are not subject to a rotating torque.

Figure 2:
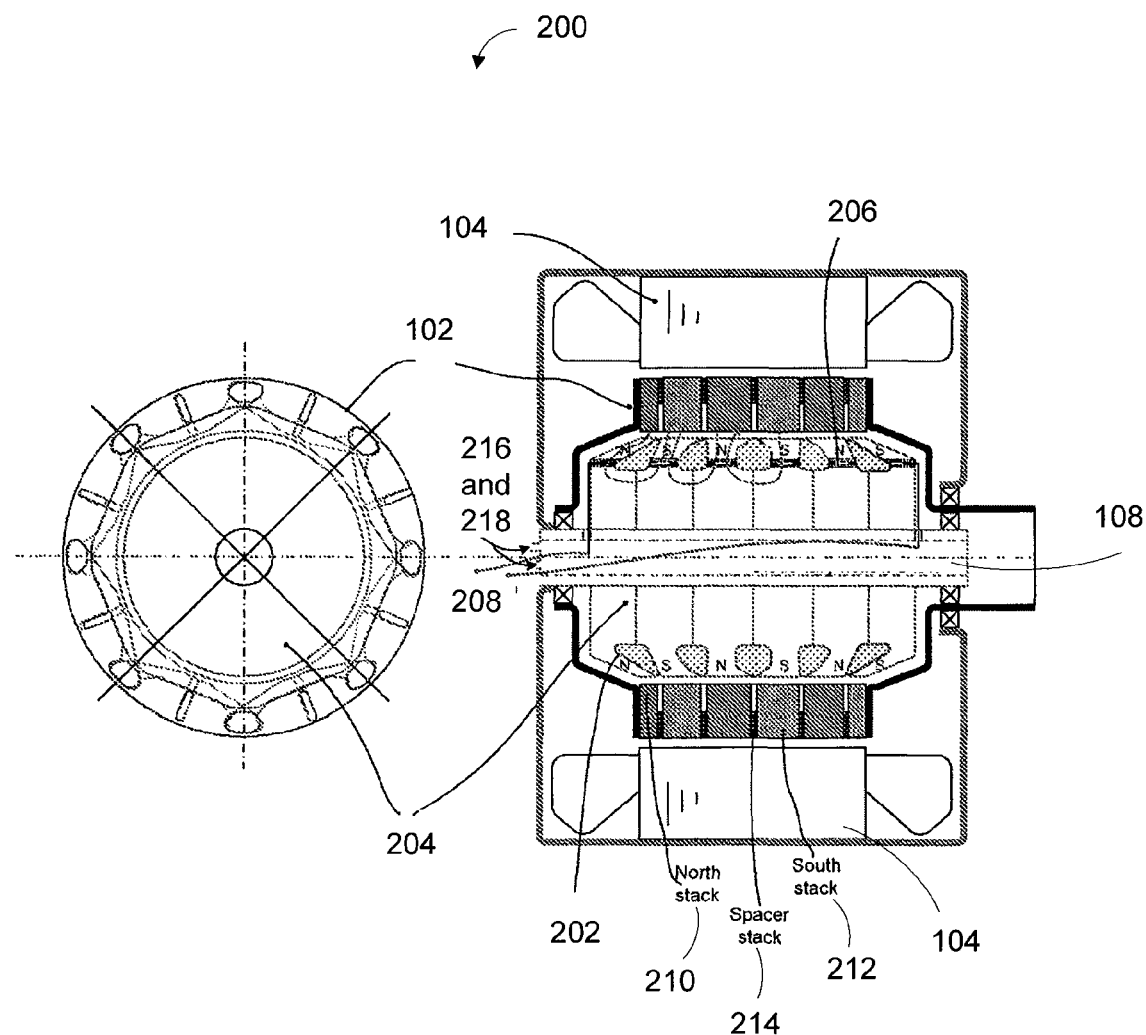
FIG. 2 is a permanent magnet-less machine.

In a brushless permanent magnet-less system 200 shown in FIG. 2, the coils 202 of the stationary excitation core 204 may be preformed. During assembly the coils 202 may be laid or positioned in the recessed ring-shape space on the disks. Connections to the coils 202 may be integrated into or may be a unitary part of the discs. Coil terminal pins may be inserted into a conducting socket (connection pin and socket shown as 206) that passes through the disc thickness through an insulator such as one or more insulation tubes. A first and last disc may have an optional radial groove formed or cut into the side surfaces of the discs that may bring the excitation leads 208 to a stationary hollow channel or coolant shaft 108.

An uncluttered rotor 102 positioned between the pair of cylindrical stator portions may include two or more uncluttered rotor pole stacks 210 and 212 that are separated by axially centered annulet dielectrics or cylindrical air gaps, for example, and spacer stacks 214. The uncluttered rotor 102 may be comprised of many materials including solid or compressed powder, laminations, punchings of magnetically conducting materials, etc. The construction and material may further include other structures and forms including those described in U.S. Pat. Nos. 7,270,203, 7,134,180, 6,977,454, and 6,891,301 that are incorporated by reference. In some systems, a hollow center channel may receive a stationary hollow center shaft 108 that may act as a cooling channel or tube that has a coolant inlet and outlet 216 and 218.

Figure 3:
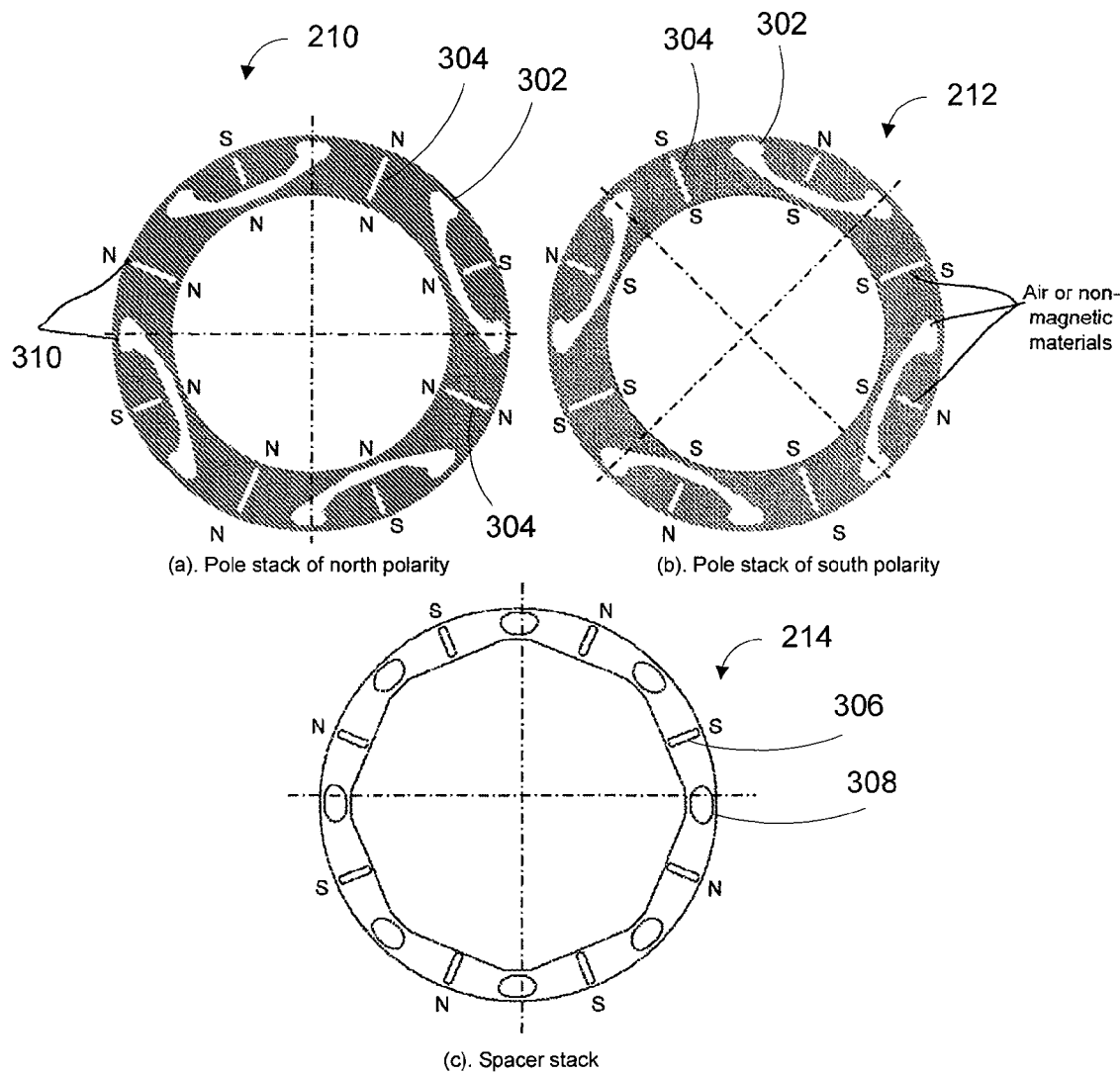
FIG. 3 shows a north polarity, south polarity, and spacer rotor stacks.

FIG. 3 shows exemplary 8-pole stacks that may form an exemplary uncluttered-rotor stack 102. The stack may be made of laminations, punchings, or through other materials and processes. When viewed from the outer diameter of the uncluttered rotor stacks (3a, 3b, and 3c), the number of magnetically isolated sections may equal the number of poles that are about equally spaced apart about an outer periphery. While the polarity along or near the outer peripheral surface alternate, the inner circumference of each of the north polarity and south polarity pole stacks (3a or 3b) maintain (or face) a common (e.g., one) polarity. The inner linear periphery (e.g., inner polygonal surfaces) of the spacer stacks 214, maintain a neutral polarity (or do not face a polarity). The non-conducting (or magnetically isolated) channels, materials, punchings, and/or narrow obround and oblate spheroid shapes 306 and 208 in the spacer stacks 214 are nearly equally spaced about the annulus of the spacer stacks 214.

The non-conducting (or magnetically isolated) channels, materials, punchings, and/or kidney-like 302 and obround shapes 304 (or dielectrics shown in FIG. 3) may be nearly identical and almost equally spaced about the annulus of the north polarity and south polarity rotor stacks 210 and 212 (3a and 3b), respectively. Between the north polarity and south polarity stacks 210 and 212, the channels, materials, punchings, and/or kidney-like 302 and obround shapes 304 (hereinafter referred to as the channel or channels) are rotated about one hundred and eighty electrical degrees apart.

When formed through a fabrication process, the magnetically isolated sections of the rotor stacks may be formed by the punched out or preformed channels. The different sections of the channels may be mechanically coupled to other layers or rotor pieces by thin bridges 310. Multiple thin bridges 310 may be used in high speed applications. In some systems, the channels may partially enclose a dielectric, non-magnetic materials, or a cooling (e.g., coolant) media.

Figure 4:
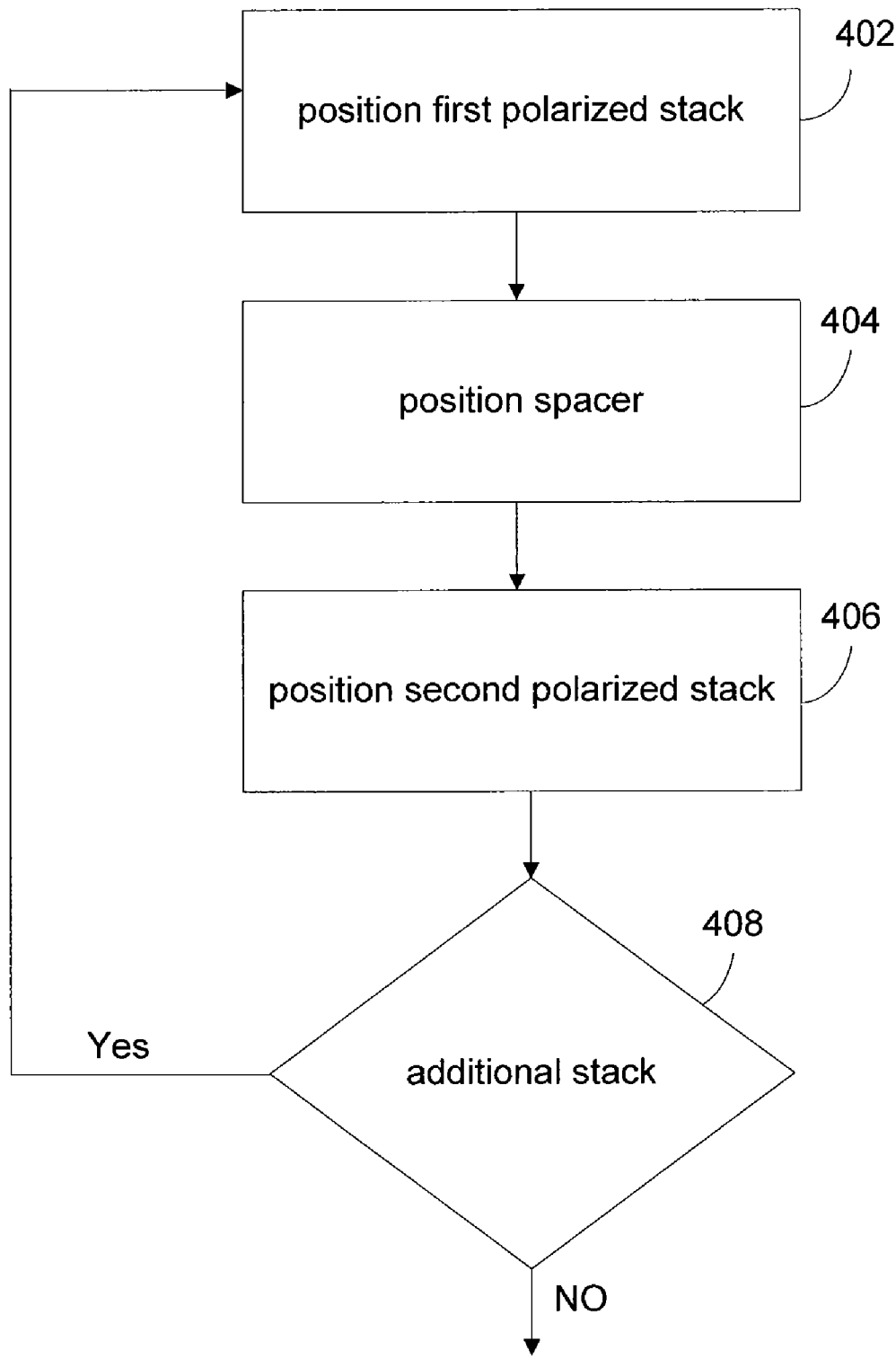
FIG. 4 is a process of assembling an uncluttered rotor.

During the rotor assembly described in FIG. 4 the channels of a stack sharing a common inner polarity may be positioned adjacent to a spacer stack separated by an axially centered annulet dielectric or air gap at 402 and 404. A second stack having an opposite inner polarity may be disposed adjacent to an opposite side of the spacer stack in a rotated position. In some synchronous systems, the second stack is rotated about 180 electric degrees from the coordinate position of the first stack at 406. A second axially centered annulet dielectric or air gap may be partially enclosed by the opposite outer surface of spacer stack and an outer surface of the second stack. As more stacks are added, the same process may be repeated at 408.

Figure 5:
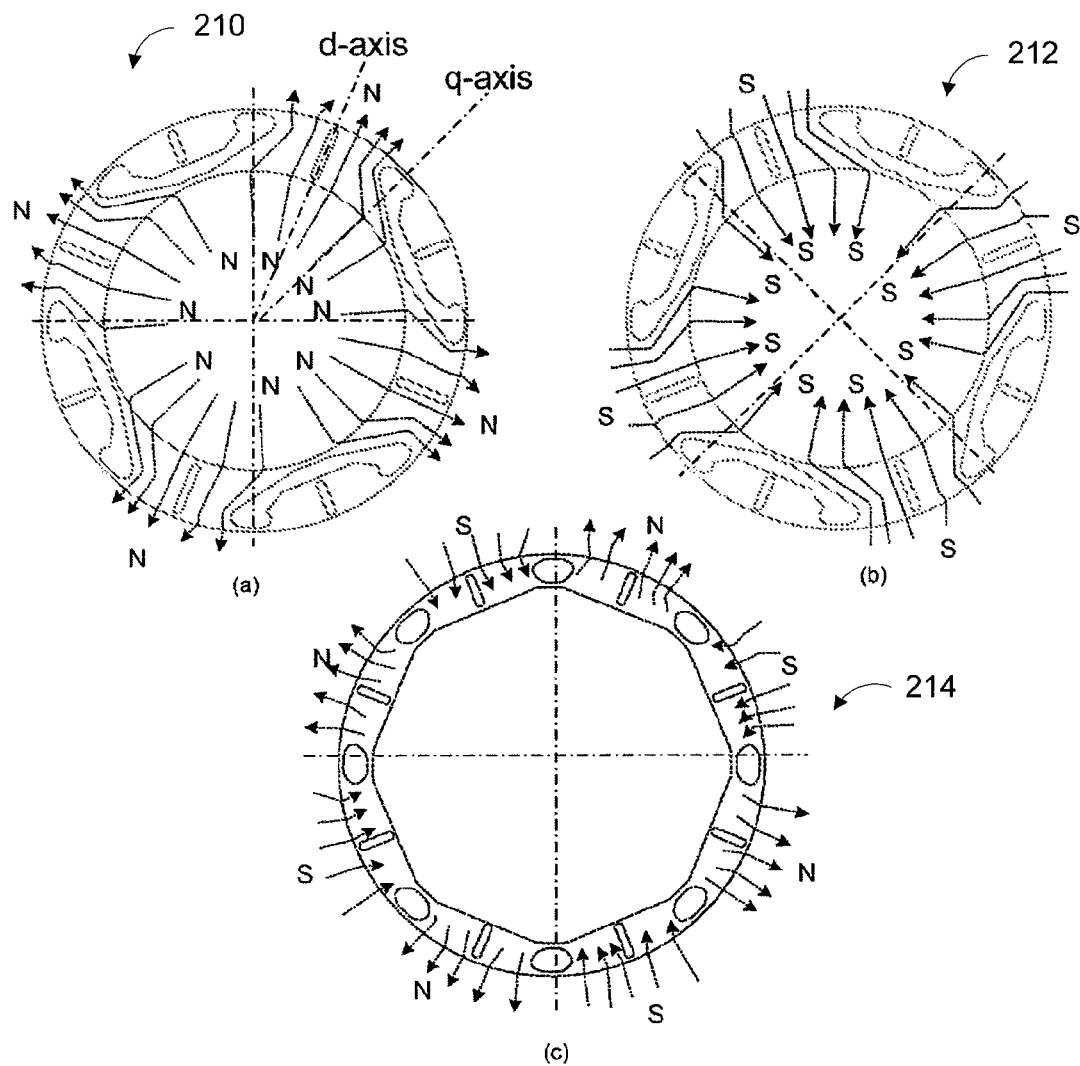
FIG. 5 shows radial flux paths of the rotor stacks.
Figure 6:
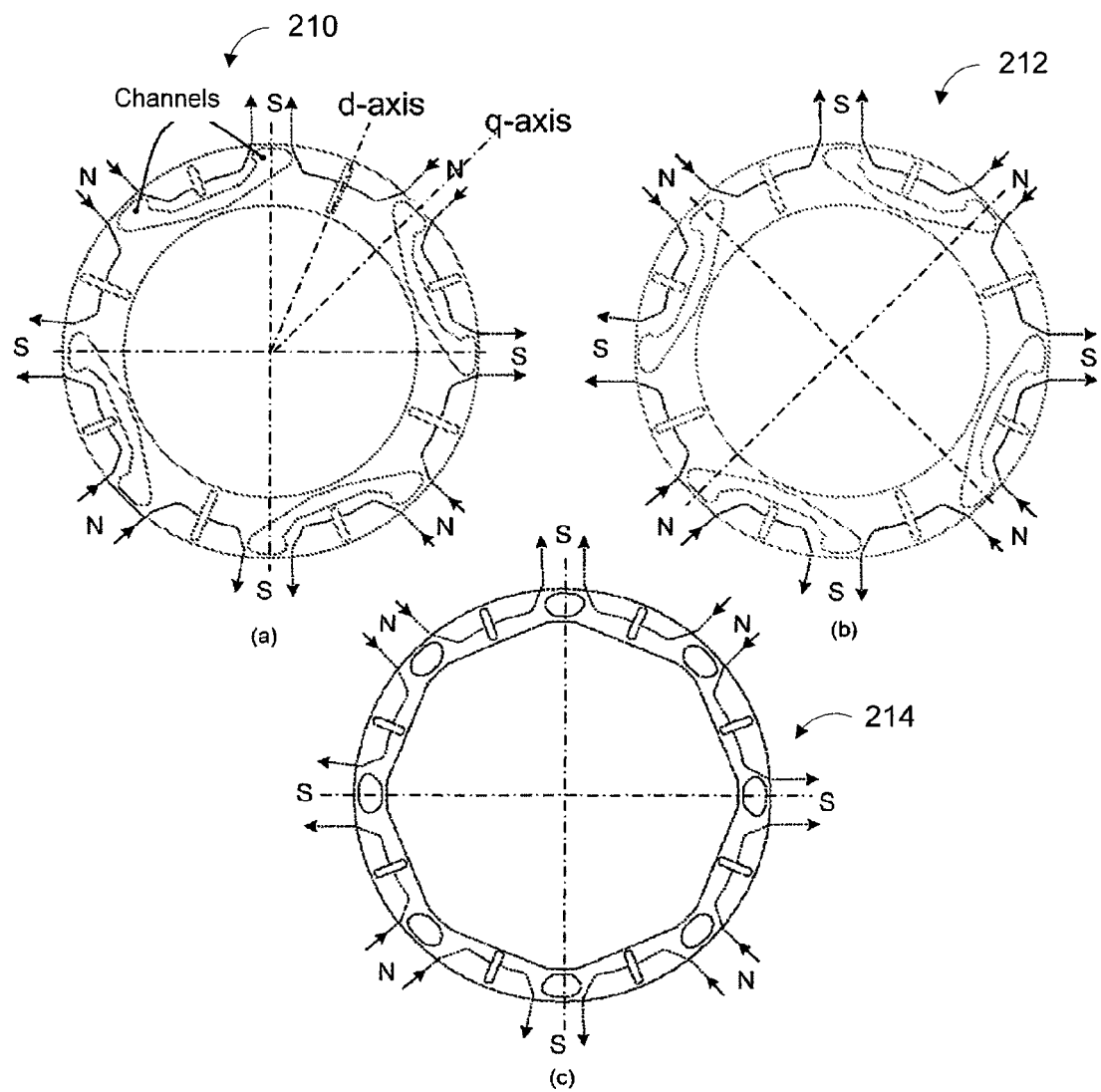
FIG. 6 shows the quadrature-axis flux paths through the rotor stacks.

FIG. 5 shows the radial flux paths of the rotor stack. FIG. 5a shows the direct-axis rotor excitation radial flux paths in the north polarity stack 210; FIG. 5b shows the direct-axis rotor excitation radial flux paths in the south polarity stack 212; and FIG. 5c shows the direct-axis rotor excitation radial flux paths in the spacer stack 214. When a magnetic revolving field is produced by the stator cuts across the rotor conductors the lines of force representing the magnetic fields may flow outward (FIG. 5a), inward (FIG. 5b), or may flow in multiple directions (as shown in FIG. 5c) distributed about an axis of rotation of the uncluttered rotor stack 102. The quadrature axis paths are shown in FIG. 6. FIG. 6a shows the quadrature axis fluxes passing though the north polarity stack 210. FIG. 6b shows the shows the quadrature axis fluxes passing through the south polarity stack 212. FIG. 6c shows the quadrature axis flux paths passing through the spacer stack 214. The magnetically isolating channels shown in FIG. 6 limit and direct the flow of the quadrature-axis flux (facing the q-axis) produced by the revolving magnetic field generated by the stator. The quadrature-axis fluxes converge at designated portions by the shapes of the non-conducting channels. This structure may produce a difference between the direct and quadrature axes that may enhance the reluctance torque component of the synchronous system.

Figure 7:
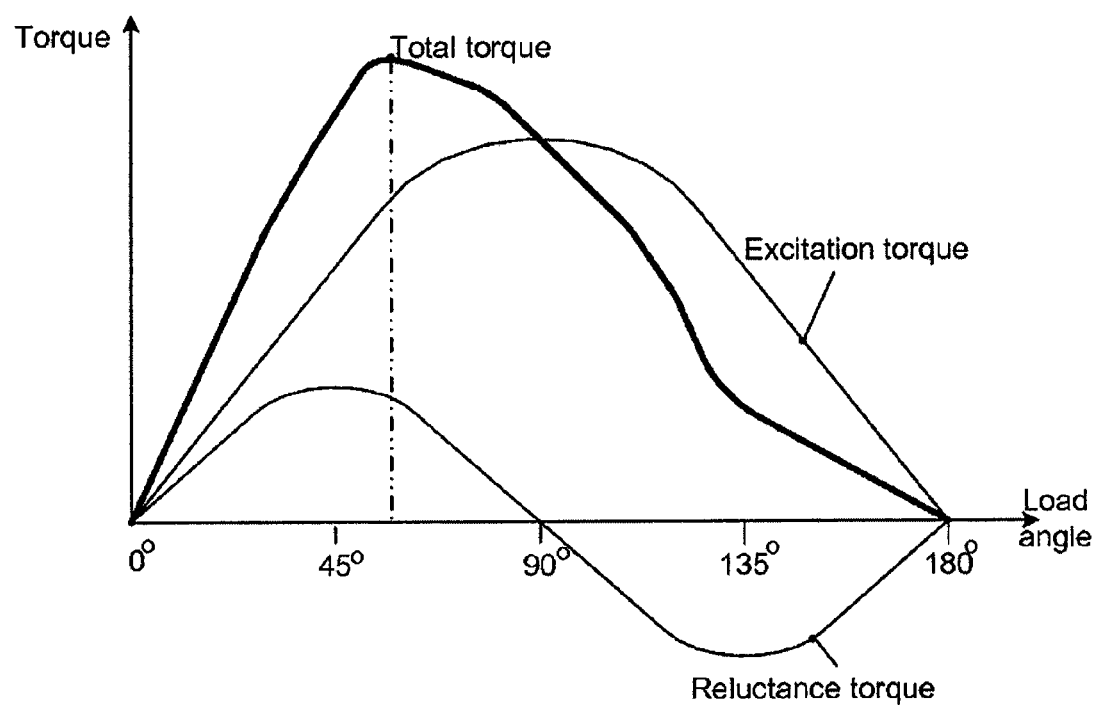
FIG. 7 is a graphical illustration of torque versus load angles.

FIG. 7 is a graphical illustration of torque versus load angles of an exemplary synchronous system. A peak torque occurs at a load angle less than 90 electric degrees. This characteristic may assure stability (e.g., a stable operating mode) when the relevant operating ranges maintain load angles less than 90 degrees. In some conventional systems synchronism may be lost when a load angle exceeds 90 degrees. The power factor generated by the systems torque production may be improved from some conventional permanent magnet machines that may have a peak torque at load angles greater than 90 electric degrees.

Other alternate systems and methods may include combinations of some or all of the structure and functions described above, incorporated by reference, or shown in one or more or each of the figures. These systems or methods are formed from any combination of structure and function described or illustrated. Some alternative systems or devices interface structures that transport person or things. The system may convert one form of energy into another (e.g., convert electric current into mechanical power).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A permanent magnet-less synchronous system comprising:
    a stator that generates a magnetic revolving field when sourced by an alternating current; and
    an uncluttered rotor disposed within the magnetic revolving field and spaced apart from the stator to form an air gap relative to an axis of rotation;
    where the uncluttered rotor comprises:
        a plurality of rotor pole stacks having an inner periphery biased by a single polarity of a north-pole field and a south-pole field, respectively, and an outer periphery biased by an alternating polarity; and
        a stationary excitation core disposed within and circumferentially separated from the plurality of rotor pole stacks, the stationary excitation core comprising a plurality of recessed ring-shaped spaces for receiving a plurality of excitation conductors, the recessed ring-shaped spaces being disposed adjacent to each other and about an axis of rotation of the uncluttered rotor; and
    where each of the inner peripheries of the rotor pole stacks biased by the single polarity are spaced apart by a spacer ring having an unbiased inner periphery.

2. The permanent magnet-less synchronous system of claim 1 where the number of sections biased by the alternating polarity comprises the number of poles of the system.

3. The permanent magnet-less synchronous system of claim 2 where each of the rotor stacks comprises a plurality of thin bridges that electrically link the poles of the rotor.

4. The permanent magnet-less synchronous system of claim 2 where the rotor pole stacks comprise stacked laminations configured to form quadrature flux paths that comprise half the poles of the rotor.

5. The permanent magnet-less synchronous system of claim 4 where the quadrature flux paths flow through a plurality of radial paths when the stator is sourced by the alternating current, the flux paths converge by isolated channels passing through each of the polarity of rotor pole stacks.

6. The permanent magnet-less synchronous system of claim 1 where the outer periphery of the spacer stack is biased by an alternating polarity that equals the number of poles of the system.

7. The permanent magnet-less synchronous system of claim 1, wherein the stationary excitation core comprises two or more magnetically conducting discs spaced apart from a stator core.

8. The permanent magnet-less synchronous system of claim 7 where the number of magnetically conducting discs is proportional to the available area for flux passing axially through the excitation core.

9. A synchronous system comprising:
    a stator that generates a magnetic revolving field when sourced by an alternating current;
    an excitation core that comprises two or more magnetically conducting discs positioned apart from the stator, the excitation core includes recessed spaces that receive excitation coils;
    an uncluttered rotor disposed within the magnetic revolving field and spaced apart from the stator to form an air gap relative to an axis of rotation;
    where the uncluttered rotor comprises:
        a plurality of rotor pole stacks having an inner periphery biased by single polarity of a north-pole field and a south-pole field, respectively, and the outer periphery of each of the rotor pole stacks are biased by an alternating polarity; and
        a stationary excitation core disposed within and circumferentially separated from the plurality of rotor pole stacks, the stationary excitation core comprising a plurality of recessed ring-shaped spaces for receiving a plurality of excitation conductors, the recessed ring-shaped spaces being disposed adjacent to each other and about an axis of rotation of the uncluttered rotor; and
    where each of the inner peripheries of the plurality of rotor pole stacks biased by the single polarity are spaced apart by a spacer ring having an unbiased inner periphery.

10. The synchronous system of claim 9 where the excitation core is axially disposed about a hollow coolant substantially cylindrical channel.

11. The synchronous system of claim 10 where the hollow coolant cylindrical channel comprises a stationary channel that includes an inlet and an outlet.

12. The synchronous system of claim 9 where plurality of rotor pole stacks comprises laminations having ferromagnetic properties and each of the rotor pole stacks is rotated about one hundred and eighty electric degrees from the other rotor pole stacks.

13. The synchronous system of claim 9 where the rotor pole stacks comprise stacked laminations configured to form quadrature flux paths when the stator is sourced by an alternating current, the flux paths are partially bounded by dielectric channels passing through each of the polarity of rotor pole stacks.

14. The permanent magnet-less synchronous system of claim 1, where the spacer ring comprises non-conducting portions that are disposed about an annulus of the spacer ring.

15. The permanent magnet-less synchronous system of claim 14, where the non-conducting portions are nearly equally spaced about the annulus of the spacer ring.

* * * * *